(12) United States Patent
Wyler

(10) Patent No.: US 8,966,125 B2
(45) Date of Patent: Feb. 24, 2015

(54) SYSTEM AND METHOD FOR INTERCONNECTION OF DIVERSE DEVICES

(75) Inventor: Gregory Thane Wyler, Sewalls Point, FL (US)

(73) Assignee: WorldVu Satellites Limited (GB)

(*) Notice: Subject to any disclaimer, the term of this patent is extended or adjusted under 35 U.S.C. 154(b) by 175 days.

(21) Appl. No.: 13/353,489

(22) Filed: Jan. 19, 2012

(65) Prior Publication Data

US 2013/0191553 A1    Jul. 25, 2013

(51) Int. Cl.
*G06F 3/00* (2006.01)
*G06F 13/12* (2006.01)

(52) U.S. Cl.
USPC ............................................... 710/5; 710/62

(58) Field of Classification Search
None
See application file for complete search history.

(56) References Cited

U.S. PATENT DOCUMENTS

| | | | |
|---|---|---|---|
| 2005/0162282 A1* | 7/2005 | Dresti et al. | 340/825.72 |
| 2006/0259184 A1* | 11/2006 | Hayes et al. | 700/221 |
| 2007/0162536 A1* | 7/2007 | Ostrovsky et al. | 709/200 |
| 2012/0079473 A1* | 3/2012 | Watanabe et al. | 717/170 |

* cited by examiner

*Primary Examiner* — Idriss N Alrobaye
*Assistant Examiner* — David Martinez
(74) *Attorney, Agent, or Firm* — Kaplan Breyer Schwarz & Ottesen, LLP

(57) ABSTRACT

A system and method for enabling communication is disclosed, wherein the system may include a plurality of media devices configured to cooperate within a media delivery environment; at least one of the media devices having a wireless communication transceiver coupled thereto; a database for storing device-specific command data for the plurality of media devices; and a computing system operable to (a) receive a request from a first media device to interact with a second media device; (b) convert the interaction request into device-specific command data for the second media device; and (c) transmit the device-specific command data to the second media device.

13 Claims, 4 Drawing Sheets

BACK END SYSTEM
300

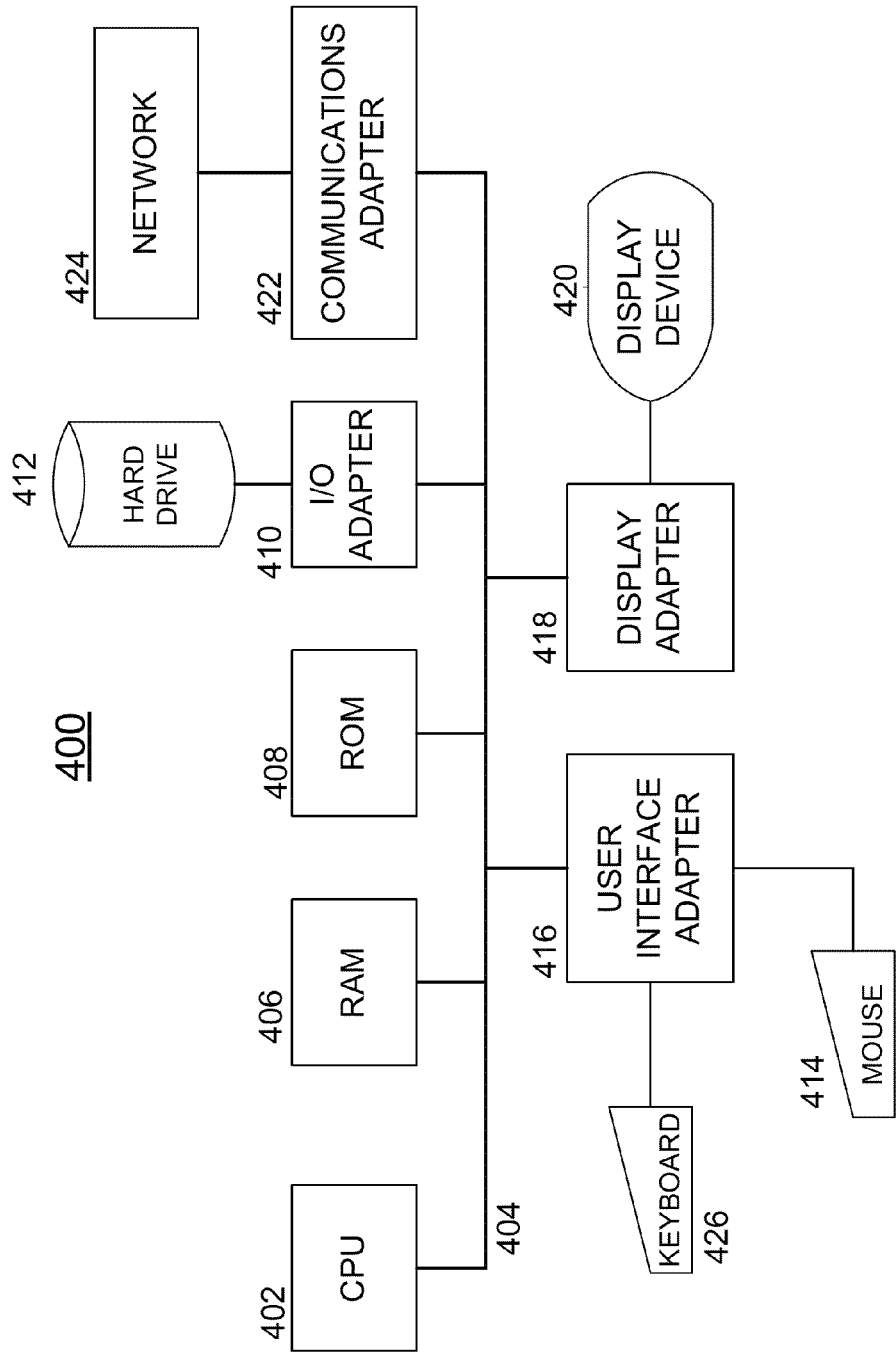

SYSTEM AND METHOD FOR INTERCONNECTION OF DIVERSE DEVICES

BACKGROUND OF THE INVENTION

The present invention relates in general to machine interfaces, and in particular to communication between media delivery devices.

Currently, home entertainment devices such as DVD (Digital Video Disk) players, television receivers, and audio receivers generally include some form of electronic interconnection means to enable the devices to communicate with a corresponding device. One current mechanism for device interconnection is the use of the High-Definition Multimedia Interface (HDMI) standard, which generally uses a cable between devices in communication with one another. In some cases, this cable may have a terminal device in the form of a connector that can be plugged into various of the units to enable interconnection for at least video transmission Control communications may also be sent over these cables, however, the communication interfaces of the various devices are not all compatible with one another. Incompatibilities may exist between devices from different manufacturers and sometimes between different models of devices from the same manufacturer. Enabling the various devices to work together within an overall system is rendered difficult by the above-recited incompatibilities.

The failure of the command interconnects is evident in view of the need for many users to use multiple remote control devices to manage their systems via the Infra-Red interface on each of the remote control devices. One approach to dealing with the above problem is to use a single remote control which can mimic the remote-control commands for each of the individual remote control units of the manufacturers. Another existing solution is to program these remote controls to join the commands together into a macro. One problem with the Infra-Red command sets is that they are a one-way control interface that lacks the ability to send information back to the remote control unit to indicate that individual commands of the macro have been executed. Since the macro commands must be executed in a specified order, a failure of any command may disable an entire sequence of commands.

Because a wide variety of media/entertainment devices are available for use together in individual entertainment systems, and because many of the remote-control-unit key sequences needed to implement specific commands are poorly documented, or undocumented, the existing art makes overall management of home theatre equipment and/or other media delivery devices very difficult. Thus, there is a need in the art for improved systems and methods for control of devices within home theater systems.

For the sake of discussion, we consider a current entertainment system that includes an A/V receiver, a Cable TV tuner, a DVD player, a television set, and one or more speakers. Initially setting up the system generally includes connecting wires between the various devices, ensuring that wire terminals are inserted into the right receptacles, as well as selecting, identifying and possibly memorializing (with a notepad, or with identifying tags on the cables and wires) the inputs to which the respective wires are connected.

For example, a first input for the television set may be for the DVD player. The input may be named by the manufacturer of the TV set, or the user may name it using a tag or other mechanism. However, an input can be pre-named "dvd player", and if the user inserts the DVD player cable into a non-DVD player input, the naming conventions will be incorrect. The same input and cross-connection identification issues arise with the A/V (Audio Video) receiver, except that there are more input and configuration selections. Typically, there are also configuration selections for the type of audio (coax, tos-link, etc.) depending on the capabilities of the DVD player and TV Tuner. There are still further configuration settings to be established for the television set, which manage brightness and picture aspect ratio.

The steps a user needs to follow to watch a movie may include: powering on the receiver, the DVD player, and the television set, then selecting the proper input on the receiver for the audio, and then selecting the proper input for presentation on the television set. While the system may have functioning audio and video links to the television set once the above steps are followed, further adjustment to the configuration may be needed to fine tune the audio and video output. For instance, the audio for the movie may not come from the DVD player, but actually may need to be sent to the television and then returned to the AV receiver through a different path, necessitating a different input on the receiver to be used for audio depending on the digital rights management of the particular movie and equipment. The totality of the above-listed connection, configuration, and fine tuning adjustments may be cumbersome, especially for less technology-literate consumers, and may thus impair the overall enjoyment of the equipment and the media (whether movie, music video or other media type) to be played on the overall system.

Thus, there is a need in the art for a system and method for configuring a home entertainment system that is less cumbersome and more rapid than what is available in the existing art.

SUMMARY OF THE INVENTION

According to one aspect, the invention is directed to a system for enabling communication, wherein the system may include a plurality of media devices configured to cooperate within a media delivery environment; at least one of the media devices having a wireless communication transceiver coupled thereto; a database for storing device-specific command data for the plurality of media devices; and a computing system operable to (a) receive a request from a first media device to interact with a second media device; (b) convert the interaction request into device-specific command data for the second media device; and (c) transmit the device-specific command data to the second media device.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 4 is a block diagram of a computer system useable in conjunction with one or more embodiments of the present invention.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 1:
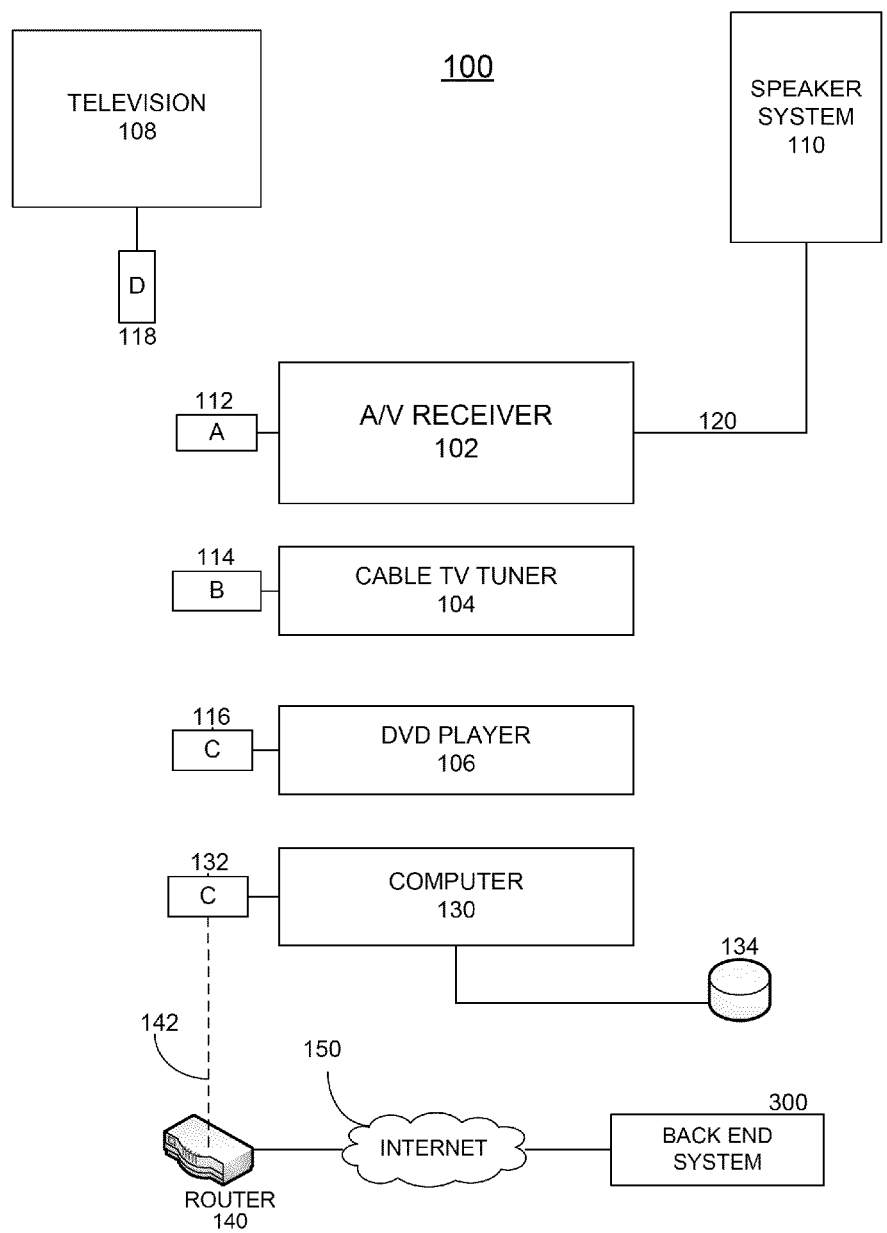
FIG. 1 is a block diagram of a system for interconnection of a plurality of media devices in accordance with an embodiment of the present invention.

FIG. 1 is a block diagram of a system 100 for interconnection of a plurality of media devices in accordance with an embodiment of the present invention. System 100 may include Audio-Video (AN) receiver 102, Cable TV tuner 014, DVD player 106, computer 130 which may be in communication with data storage device 134, speaker system 110 (which may include one or more speakers), television 108, router 140, and/or back end system 300, where both back end system 300 and router 140 may both be connected to the internet 150.

System 100 may further include a plurality of communication nodes. Nodes 112, 114, 116, 118, 132, may be coupled through suitable connections to A/V receiver 102, cable TV tuner 104, DVD player 106, television 108, and computer 130, respectively. The details of the various nodes are described further in connection with node 200 of FIG. 2 which generally corresponds to nodes 112, 114, 116 etc of FIG. 1. Node 200 (and the nodes of FIG. 1) may be wireless transceiver devices with a plurality of data communication ports, and which may further include processors and data storage capability therein.

Router 140 may be in communication with computer 130 and/or other devices shown in FIG. 1 using wireless communication link 142. Specifically, router 140 may be placed in wireless communication with one or more of nodes 112, 114, 116, 118, and 132. A/V receiver 102 may send speaker control signals along wired connection 120 to speaker system 110. However, in an alternative embodiment speaker system 110 could be equipped with a wireless node and receive speaker data wirelessly. In this alternative embodiment, speaker system 110 could receive power separately from the communication path 120, while receiving data wirelessly along path 120.

System 10 is preferably operable to provide wireless interconnections of the various media devices, with each device using its respective node 200 to communicate with either a central device, such as computer 130, or with another media device using peer-to-peer communications in a mesh network. System 10 is directed to enabling easier, more rapid, and more readily adaptable device setup and interoperability than is possible using existing technology.

System 10 may include a machine-to-machine interpreter and control system with nodes that plug into the respective media devices. An interpretation and control system may receive commands from one of the devices and convert the commands into a form understandable to one or more other devices with in the system 10. The control system may also receive data from one or more of the devices and generate commands to be implemented by one of the devices of FIG. 1. The control system may be implemented in any computing device capable of communicating with devices, 102, 104, 106, 108, and/or 110, including but not limited to computer 130 and/or any computer within back end system 300, which is described in greater detail in connection with FIG. 3. Alternatively, the interpretation and control system could be implemented in the nodes 112, 114, 116 etc themselves, using the processors 230 and storage devices 232 (FIG. 2) that may be included within one or more of the nodes.

In one embodiment, the interpreter function, described above, may be updated using internet 150 to ensure that the command sets used by the interpreter correspond to the command sets understood by the devices the commands are intended for.

In an embodiment, a communally accessible database, which may be located in data storage device 134 (or in data storage device 311 of back end system 300), may be implemented so that users can update the command set for different devices, and so that the command sets are available to all nodes to use in order to update their respective communications capabilities. For example, if a new channel becomes available on A/V receiver 102, this information may be stored in database 134 and may thereafter be made available to cable TV tuner 104, computer 130, or other device within system 10.

In an embodiment, a registration and management system may be implemented in computer 130, in back end system 300, or other suitable computing system. This registration and management system may control the cross connects of audio and video data streams and may command and control various different devices from different manufacturers, thereby enabling interoperability of devices of diverse type, and diverse origin.

In the following, we discuss one embodiment for the construction of node 200 of FIG. 2. Thereafter we discuss features that may be present in various embodiments of node 200. In the following, node 200, though numbered separately, may correspond to any one of nodes 112, 114, 116, and 118 shown coupled to various respective media devices in FIG. 1. However, various embodiments of node 200 (and therefore of the nodes of FIG. 1) are discussed in this section. The nodes of the embodiment of FIG. 1 may include any desired selection of the features of node 200 discussed herein.

Node 200 is preferably operable to provide a universal interface from any media device within an entertainment system to any other device within the entertainment system, or any other system including a plurality of devices capable of communicating with one another. In one embodiment, each media device may have its own communications node 200, as is shown in FIG. 1. In this situation, each such node 200 preferably includes at least one data communications interface suitable for interfacing with the device that it is coupled to, and at least one wireless antenna capable of transmitting and receiving data using a commonly used standard such as, but not limited to, embedded wireless WIFI, Wi-GIG/BT. We note that other wireless communication standards may be employed. In the following, we list various communication interfaces and operational components that may included in each node 200.

A set of nodes 200 (FIG. 2) may be operable to manage connections and switching for the transmission of audio and/or video data among the various media devices of FIG. 1, thereby simplifying the control of the switching (for instance the television only needs one input) and allowing new devices to present audio and video streams to the television on an ad-hoc basis.

The nodes 200 (FIG. 2) may include data transport for video and audio along with the control and signaling transport and interpretation, which operates as a mesh network to allow any node to contact and transport audio or video to any other node in a peer-to-peer direct connection. In one embodiment, the nodes may be operable to transport video and/or audio data directly from one node to another, without first sending the data though an intermediary device.

Figure 2:
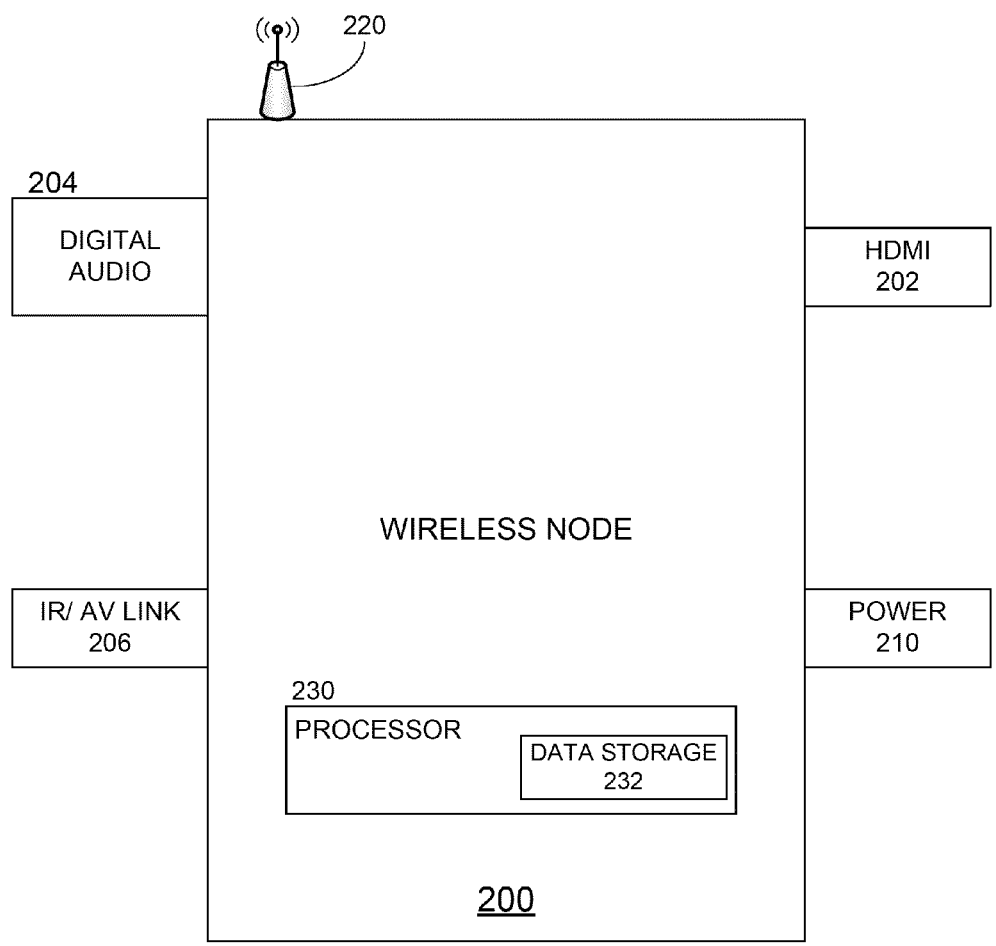
FIG. 2 is a schematic diagram of a wireless communication node in accordance with an embodiment of the present invention.

In the embodiment of FIG. 2, node 200 may include wireless antenna 220 (which may be a WIFI antenna), digital audio port 204 (which may transmit/receive optical digital data), HDMI port 202, IR/AV (infra-red/AV) link 206, power link 210, and/or processor 230. Node 200 may be a wireless device that is external to each media device having a node 200 coupled thereto, which node can be interfaced with other devices within a home theatre entertainment system. Alternatively, node 200 could be located within each media device, instead of being outside the device. In the embodiment of FIGS. 1-2, node 200 may have a wired connection to the media device it is shown coupled to (such as for instance node 112 to AN receiver 102), and wireless data communication to other devices within system 10 of FIG. 1, such as for instance wireless data communication path 142 between node 132 of computer 130, and router 140. However, in alternative embodiments, the communication between the respective nodes 200 (i.e. including nodes 112, 114, 116 etc.) of FIG. 1 could communicate with one another using wired connections. Moreover, a combination of wireless and wired connections could be used for the communication between the nodes 200 of FIG. 1.

Each node 200 may have a variety of input and/or output ports. Node 200 may include connections for power 210, HDMI 202, Infrared/AV link 206 using a ⅛" jack connector, and/or digital audio output 204. The input/output from digital audio port 204 may be optical or electrical. Nodes 200 may plug into the respective HDMI ports of each of the relevant media devices (such as devices 102, 104, 106 of FIG. 1), as shown in FIG. 1. An exemplary list of media devices to which nodes 200 may be attached include, but is not limited to, television sets, Blue-Ray DVD players, Cable TV tuners, audio receivers and/or audio-video receivers.

Nodes 200 preferably provide data input and output capabilities for the various media devices. Nodes 200 may also provide control data to and from the respective media devices. In alternative embodiments, the functions of nodes 200 may be embedded into the respective media devices, rather than being performed by separate devices that are in communication with the respective media devices.

Once nodes 200 are connected to their respective media devices, the nodes 200 preferably detect the machine connected thereto through a variety of means, including the HDMI-CEC protocol which can identify the device name. Nodes 200 may then communicate via a wireless protocol to a communal database, preferably stored on back end system 300, to receive instructions on how best to communicate with each media device. We now turn to a preferred system for hosting the communal database referred to above.

Figure 3:
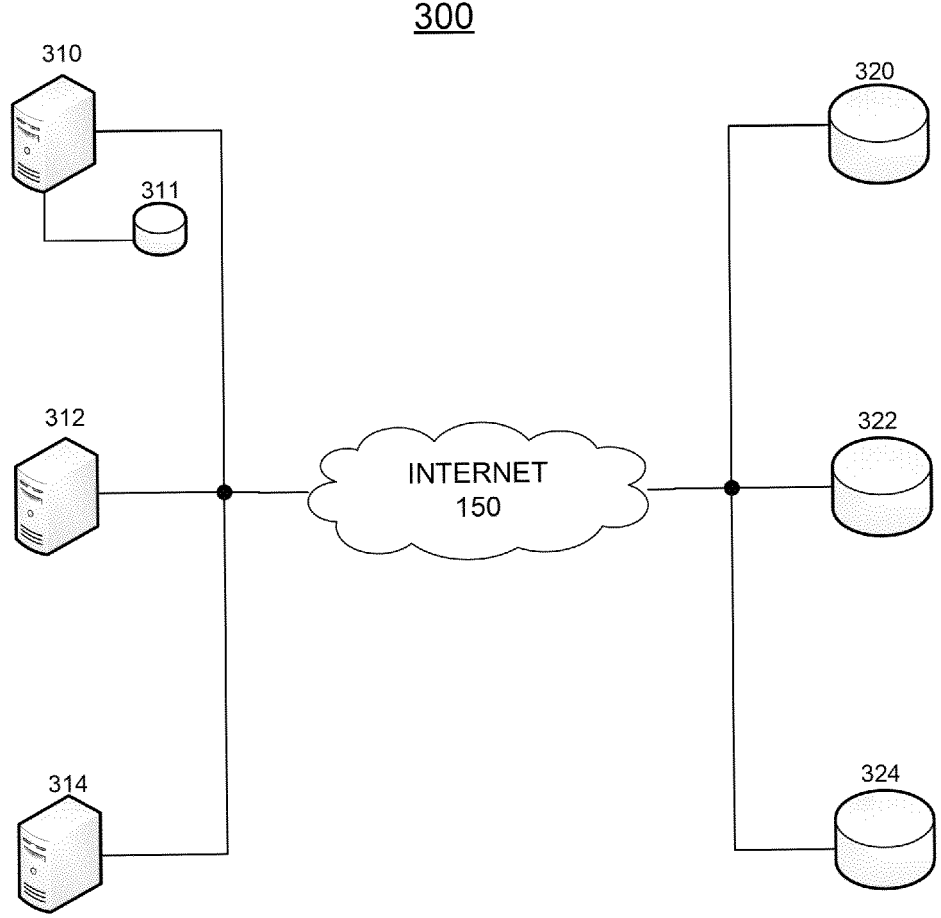
FIG. 3 is a block diagram of a back end system in accordance with one or more embodiments of the present invention.

FIG. 3 is a block diagram of an embodiment of back end system 300 shown in FIG. 1. An embodiment of back end system 300 may be operable to store the identities, command sets, locations, and system configurations of media devices 102, 104, 106, 108, and/ 110 (and/or further devices) of FIG. 1 in communal database 311. Back end system 300 may be operable to receive a command from an originating device and conduct any needed interpretation to convert the commands into a form needed by the device that is the intended destination device for the command (such as a DVD player 106 requesting that television set 108 play video originating from DVD player 106). Alternatively, back end system 300 may download the specifications of a destination device to a node 200 of an originating device, and the node 200 itself may conduct any needed interpretations for the command set of a destination device. A more specific example of this interpretation process is discussed later in this specification.

Back end system 300 may provide setup and configuration services for the various media devices shown in FIG. 1 that may replace the setup and configuration activity that in existing systems would be conducted at the media devices themselves.

However, back end system 300 preferably provides considerably greater computing power and greater data storage resources than that available on even a large number of consumer media devices. Moreover, the configuration and setup data, once entered onto back end system 300, may be accessible to one or more authorized parties other than the user of the media devices shown in FIG. 1. Further, the pertinent setup data may be adjusted as needed to reflect changes in media devices included within system 10 of FIG. 1, the command sets understood by the respective devices and/or changes in the amount and type of media services available at the respective media devices of system 10.

Back end system 300 may include computer systems 310, 312, and 314; and/or data storage facilities 320, 322, and 324. Computer system 310 is shown including a local data storage device 311, which may also be referred to as communal database 311. However, any of the computer systems shown in FIG. 2 may also include local data storage. While three computer systems and three data storage facilities are shown in FIG. 2, it will be appreciated that fewer or more than three computing systems, and fewer or more than three data storage facilities may be configured for use with back end system 300. The equipment of back end system 300 may be concentrated at one location. However, alternatively, the various operational components of back end system 300 may be distributed over the internet 150 and may communicate with one another over the "cloud" as needed. Moreover, the functionality of back end system 300 need not be permanently assigned to any fixed set of hardware devices. Instead, the functionality and/or data storage of back end system 300 may be migrated to computing systems on a for-hire basis, as needed. Thus, for instance, communal database 311 is not limited to being stored on one specific data storage device, but may instead be distributed over any number of data storage devices accessible by the processing ability of back end system 300.

An example is considered in which DVD player 106 (the origin device) is expected to play a disk and transmit video data from the disk to television 108 (the destination device). According to one embodiment, addressed in this section, back end system 300 may possess data describing the various media devices within system 10 and may deliver the needed command instructions to the respective devices. Under this approach, DVD player 106 may first signal back end system 300, via router 140, that it has video data for delivery to television 108. Upon receiving the request, back end system 300 consults communal database 311 to determine the command sets of the origin and destination devices and to convert the stated request from origin device, DVD player 106, into the commands that can be understood by television 108, the destination device. Back end system 300 may then transmit control data back to system 10 that includes (a) instructions to television 108 to begin receiving and displaying data to be received from DVD player 106, the instructions having been specifically tailored for the brand and model of television 108; and/or (b) signaling commands to let DVD player 106 know when television 108 is ready to receive audio/video data from DVD player 106. Alternatively, nodes 116 and/ nodes 118 (collectively nodes 200) and/or other nodes within system 10 may perform one or more of the functions described above as being performed by back end system 300. Once both DVD player 106 and television set 108 are ready, DVD player 106 may begin transmitting audio/video data directly to television 108. Thus, in the above example, control and signaling data were obtained by interpreting a request from DVD player 106, and generating suitable instructions/commands for television set 108. However, the payload data (the actual underlying video and audio data for presentation by television set 108 and consumption by a user of television set 108) is preferably transmitted directly from DVD player 106 to television set 108, via their respective nodes (i.e. nodes 116 and 118), without the need for back end system 300 to serve an intermediary.

Communal database 311 may include a registration and management system that may be operable to store the specific commands for each of the media devices (such as devices 104, 104, 106, etc.) to enable back end system 300 to correlate a general instruction (such as "play video on television set") to a command set specific to the particular brand and model of television set 108, and possibly also specific to device settings already entered into television set 108. The command details associated with television set 108 in communal database 311 may be readily updated, using the internet, to reflect changes in system 10, including but not limited to: a change in brand or model of television set 108; a change in DVD player 106; and/or a change in the audio or video settings of television set 108 whether entered manually and locally or by remote devices.

In an alternative embodiment, the storage of device-specific commands, the registration and management function which forms part of the communal database, and the conversion of general commands from an originating device into device-specific commands for a destination device may be performed wholly, or in part, by the nodes 200 themselves. Nodes 200 may include respective processors 230 and data storage devices 232 which together may be operable to perform the functions discussed above in connection with back end system 300. The data processing and data storage burden may be allocated among the nodes 200 (such as nodes 112, 114, 116 etc.) so as to not overburden any processor 230 of any one node 200.

With reference to FIG. 3, communal database 311 may be updated from a variety of sources to ensure it is up to date. In one embodiment, a variety of possible communication mechanisms may be made available to nodes 200 by the respective media devices with which the nodes 200 are associated.

The communication mechanisms may include: (1) each device having an NFC (near field communications) strip uniquely identifying the device; (2) the user's cell phone having NFC capability; (3) the user running an application on his/her cell phone which may prompt the user to place the phone near the device to be identified, and the cell phone then picking up the specific identification information and then transmitting the information to a database constructed for the user which includes data describing each of the user's devices.

Thereafter, one or more of the following events may occur: (a) the cell phone may configure itself to communicate directly with each device using Bluetooth, WIFI or other appropriate communication protocol; (b) the cell phone application may then look up the particular settings and interconnections required for the pertinent media devices concerned and apply those settings to the media devices. The settings and interconnections to be looked up may include macros (sets of instructions represented using an abbreviated format) based on actions to be taken. For example, "play" may be pressed on the DVD player 6, which may in turn trigger a host of settings on the rest of the equipment. The settings and interconnection information may further include the translation settings which are preferably operable to ensure that each device can communicate with all other devices within a local media system. The settings and interconnection information may further include username/password/ssid (Service Set Identification) or other settings to configure appropriate access for each device to reach the internet as may be needed, or to enable the devices to communicate with each other.

Once the foregoing has been completed, the cell phone application may then configure each device's user name and passwords to enable access a local WIFI node if the local WIFI node is configured correctly. Thereafter, the cell phone may configure itself to act as a wireless remote control for all of the media devices.

On occasion, in the future, if internet 150 access is available to the devices, the devices may update their settings in the communal database 311 (or in a node-based equivalent to database 311), based on modifications suggested by the controlling websites. The nodes 200 themselves may also operate as internet access nodes for each of the media devices (such as receiver 102, tuner 104, DVD player 106, television 108 etc.) they are connected to via HDMI, since selected HDMI versions include internet links.

The user may have access to a web site and associated user interface so as to conveniently access data describing the user's equipment and the programming logic of the equipment. The user may also be able to share programming logic with other users who have similar devices. The user interface preferably enables the user to suitably update the communal database 311 to reflect any changes in equipment within, changes to the settings of the equipment in, and/or other changes in the operating status of, system 10. Thus, if the user to were replace a first television set 108 of brand "A" with a second television set 108 of brand "B", the device-specific commands needed to instruct television set 108 to begin using an input port from Cable TV tuner 104 may well change. Thus, a problem could arise if data describing the contents of system 10 at communal database 311 were left unchanged. However, once the user updates the status of television set 108 so that communal database 311 has data that correctly reflects the fact that a brand "B" television set is now installed in system 10, back end system 300 will able to generate the right device-specific commands for television set 108 upon receiving a request from Cable TV tuner 104.

Alternatively, television set 108 of brand B, once powered on, and installed in system 10, may be able to send out a message using node 118 to inform back end system 300 of its brand and model status and/or its command set, to enable back end system 300 to update the device-specific instructions associated with television 108 in communal database 311.

FIG. 4 is a block diagram of a computing system 400 adaptable for use with one or more embodiments of the present invention. Central processing unit (CPU) 402 may be coupled to bus 404. In addition, bus 404 may be coupled to random access memory (RAM) 406, read only memory (ROM) 408, input/output (I/O) adapter 410, communications adapter 422, user interface adapter 406, and display adapter 418.

In an embodiment, RAM 406 and/or ROM 408 may hold user data, system data, and/or programs. I/O adapter 410 may connect storage devices, such as hard drive 412, a CD-ROM (not shown), or other mass storage device to computing system 400. Communications adapter 422 may couple computing system 400 to a local, wide-area, or global network 424. User interface adapter 416 may couple user input devices, such as keyboard 426, scanner 428 and/or pointing device 414, to computing system 400. Moreover, display adapter 418 may be driven by CPU 402 to control the display on display device 420. CPU 402 may be any general purpose CPU.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system for enabling communication, the system comprising:
   a plurality of media devices configured to cooperate within a media delivery environment with each media device having device-specific command data different from the other media devices, the command data related to delivery of audio/video data from one media device to another media device;
   at least one of said media devices having a wireless communication transceiver coupled thereto;
   a database for storing the device-specific command data for the plurality of media devices; and
   a computing system operable to, in real-time, (a) receive a request from a first one of said media devices to interact with a second one of said media devices in the form of a command data; (b) convert the received command data into device-specific command data for the second media device, which is different from the received command data; and (c) transmit the converted device-specific command data to the second media device so as to deliver the audio/video data.

2. The system of claim 1 wherein the computing system and database are hosted by a back end system and which communicate with the plurality of media devices over the internet.

3. The system of claim 1 wherein the computing system and database are incorporated within the at least one wireless communication transceiver.

4. The system of claim 1 wherein each of said media devices has a wireless communication transceiver coupled thereto.

5. The system of claim 1 wherein said transceiver is coupled to its media device over an HDMI (high definition multimedia interface) port.

6. The system of claim 5 wherein said transceiver comprises at least one additional data communication port selected from the group consisting of: (a) a digital audio port; and (b) an infra-red audio-video port.

7. The system of claim 1 wherein at least one said transceiver comprises a processor coupled to a data storage device.

8. The system of claim 1 wherein the converted device-specific command data for the second media device is sufficient to allow the second media device to play the audio/video data without further user involvement.

9. A method, comprising:
   providing an entertainment system having a plurality of media devices, with each media device having device-specific command data different from the other media devices, the command data related to transmission of audio/video data from one media device to another media device, selected ones of the media devices having wireless transceivers coupled thereto;
   a first said media device issuing a request to transmit the audio/video data to a second said media device in the form of a command data;
   converting the received command data into device-specific command data tailored for said second media device, which is different from the received command data; and
   transmitting the converted device-specific command data to the second media device device so as to transmit the audio/video data.

10. The method of claim 9 further comprising:
    storing command data specific to the plurality of media devices in a communal database.

11. The method of claim 10 wherein the step of converting comprises:
    a computing system receiving the request from the first media device;
    the computing system accessing device-specific command data for the second media device from the communal database; and
    the computing system generating said device-specific command data for the second media device using said received request and said accessed device-specific command data.

12. The method of claim 11 wherein the transmitting step comprises:
    the computing system sending the generated device-specific command data to the second media device.

13. The method of claim 12 wherein the sending step comprises:
    sending the generated device-specific command data from a back end system hosting the computing system and the communal database over the internet to the second media device.

* * * * *